United States Patent [19]

Shope et al.

[11] Patent Number: 5,047,955
[45] Date of Patent: Sep. 10, 1991

[54] ELECTRONIC COLLATION

[75] Inventors: Gary W. Shope, Rochester; Russell L. Godshalk, Hilton, both of N.Y.

[73] Assignee: Eastman Kodak Company, Rochester, N.Y.

[21] Appl. No.: 63,882

[22] Filed: Jun. 19, 1987

[51] Int. Cl.⁵ .............................................. G06F 15/20
[52] U.S. Cl. .................................................... 364/519
[58] Field of Search ............................... 364/518–519; 400/17, 76; 358/296; 382/44–47

[56] References Cited

U.S. PATENT DOCUMENTS

| | | | |
|---|---|---|---|
| 4,302,782 | 11/1981 | Gunning et al. | 358/296 |
| 4,413,264 | 11/1983 | Cruz-Uribe et al. | 346/1.1 |
| 4,613,877 | 9/1986 | Spencer et al. | 346/160 |
| 4,677,551 | 6/1987 | Suganuma | 400/76 |
| 4,725,158 | 2/1988 | Ueda et al. | 400/76 |

Primary Examiner—H. Herndon
Attorney, Agent, or Firm—Milton S. Sales

[57] ABSTRACT

An electronic printer receives multi-page documents as character code signals which are applied to a raster image processor for rasterization. The rasterized signals are electronically stored so that a plurality of electronically collated, multi-page sets can be printed without re-rasterization.

6 Claims, 1 Drawing Sheet

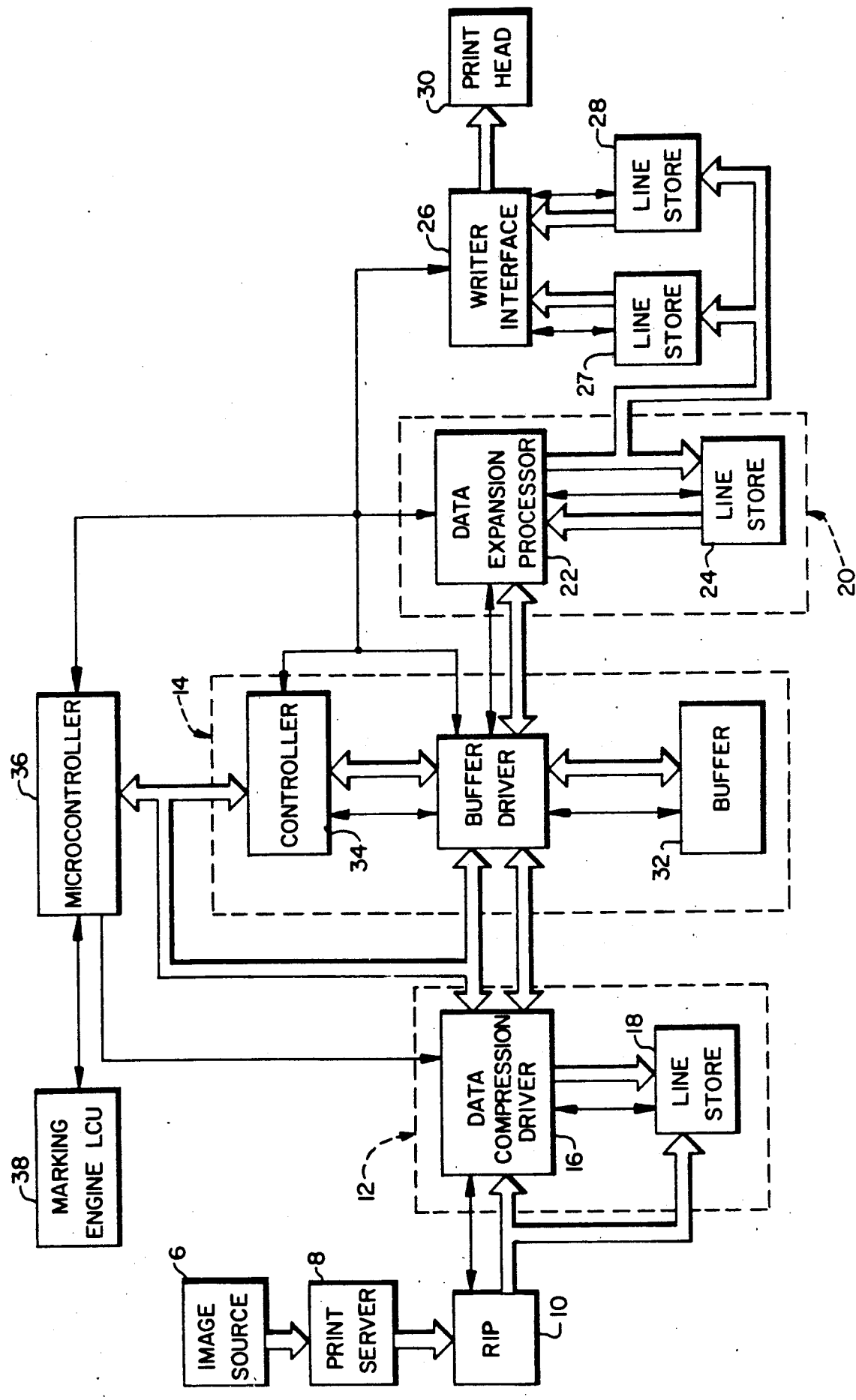

ELECTRONIC COLLATION

BACKGROUND OF THE INVENTION

1. Field of the Invention

This invention relates generally to electronic printers wherein multi-page documents to be printed are received as character code signals to be applied to a raster image processor for rasterization, and more particularly to such printers having means to electronically store the signals for collation printing of a plurality of multi-page document sets.

2. Description of the Prior Art

Computer work stations, work processors, and the like generally produce print jobs as character code signals, such as ASCII code. The print jobs are queued in a print server, and spooled one page at a time to a raster image processor (RIP). The RIP converts the coded signals to a rasterized video data stream for printing pixel (picture element) by pixel. When a plurality of printed sets of a multi-page document are desired, the print server can electronically collate the pages and present them to the RIP in the proper sequence, as often as is needed to produce the desired number of collated sets.

In high speed printers, such systems suffer from the disadvantage that the rasterization process of each page of the document must be repeated for every collated set to be printed. Since rasterization can be a time consuming process, repeated re-rasterization greatly slows the printing process.

SUMMARY OF THE INVENTION

It is an object of the present invention to provide an electronic copier/printer, of the type wherein multi-page documents may be received as character code signals which are applied to a raster image processor for rasterization, with means to electronically store the signals in rasterized form so that a plurality of electronically collated sets can be copied or printed without re-rasterization.

An unexpected advantage which flows from the present invention results from the fact that rasterized signals are generally more efficient to compress and expand than are character code signals. Accordingly, when compression is used, the effective storage capacity of the electronic storage means is increased if it is located after, rather than before, the RIP.

In accordance with one aspect of the present invention, an electronic copier/printer receives multi-page image data as character code signals to be applied to a raster image processor for conversion to a rasterized video data stream for printing. Means, sequentially following the raster image processor, electronically store the image data in rasterized form; and electronic collation means present the storage image data for printing in the proper sequence, as often as is needed to produce the desired number of collated document sets, whereby a plurality of electronically collated, multi-page sets can be printed without re-rasterization.

In accordance with another aspect of the present invention, a process is provided for producing a desired number of collated sets of multi-page documents from image data received as character code signals. The process includes the steps of applying the character code signals to a raster image processor for conversion to a rasterized video data stream for printing, electronically storing the image data in rasterized form, and electronically collating the stored image data by presenting it for printing in the proper sequence, as often as is needed to produce the desired number of collated document sets, whereby a plurality of electronically collated, multi-page sets can be printed without re-rasterization.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawing, which is a block diagram of the preferred embodiment of the printer control system of the present invention.

DETAILED DESCRIPTION OF THE PREFERRED EMBODIMENT

Referring now to the drawing, printer elements are interconnected by a series of data links shown as double-line arrows and control links shown as single-line arrows. Computer work stations, main frames, word processors, and the like (referred to generally as image source 6) produce print jobs as character code signals. Print jobs are queued in a print server 8, and are spooled one page at a time to a raster image processor (RIP) 10. The RIP converts the character code signals to a rasterized video data stream for printing pixel by pixel.

A job image buffer (JIB) receives the image data stream from RIP 10. The JIB includes a data compressor 12, which is preferably a hardware implementation of an appropriate algorithm which encodes redundant information into a more compact form before passing the compressed data stream to a multi-page image buffer 14, also part of the JIB. A preferred compression algorithm is the CCITT Group IV facsimile algorithm, which is well known to those skilled in the art, but other forms of data compression are available, and reference is made to *Data Compression* by Gilbert Held, 1983, John Wiley and Sons, for examples of various compression techniques. Data compressor 12 includes a data stream compression driver 16 and a line store 18 for buffering a full line's worth of data.

An expander 20 is the companion to data compressor 12, and it includes a data expansion processor 22 and a line store 24. The expander retrieves the compressed data stream from multi-page image buffer 14 and reconstructs the output data into original form for a writer interface 26, also part of the Jib.

The writer interface receives a full line of image data from the expander as the line is processed, and has a pair of line stores 27 and 28 and random logic to resequence the data stream before sending it to a print head 30.

Multi-page image buffer 14 is provided for storing image data to permit the electronic recirculation of images for collation; thereby eliminating the need for a mechanical recirculating document handler. The heart of the JIB is a large bank of dynamic random access memory (DRAM) in a buffer 32 for storage of the image data as it is processed by data compressor 12.

Controller 34 acts as a direct memory access controller, allowing data compressor 12 and expander 20 direct access to DRAM buffer 32 without a microprocessor, and as a DRAM controller arbitrating between memory read, write, and refresh cycles.

A microcontroller 36 functions as the system manager, overseeing the overall operation of the JIB. The microcontroller will handle communication with a logic and control unit (LCU) 38 of the marking engine, store the internal pointers identifying the beginning and ending addresses for each image, initiate transfers from the RIP, and control the data compression and expansion process.

Microcontroller 36 and LCU 38 comprise electronic collation means for presenting the stored image data for printing in the proper sequence, as often as is needed to produce the desired number of collated document sets, whereby a plurality of electronically collated, multi-page sets can be printed without re-rasterization. That is, because the JIB is located between RIP 10 and writer print head 30, a plurality of electronically collated sets of multi-page documents stored in the multi-page image buffer 14 may be printed without re-rasterization of each page of the document for every set to be printed. Thus, the marking engine doesn't have to wait for the RIP with each set.

Further, because rasterized signals are generally easier to compress and expand than are character coded signals, the effective storage capacity of the electronic storage means may be increased by the use of compression techniques if the storage means is located after, rather than before, the RIP.

The invention has been described in detail with particular reference to preferred embodiments thereof, but it will be understood that variations and modifications can be effected within the spirit and scope of the invention.

What is claimed is:

1. In an electronic printer of the type wherein a desired plurality of collated sets of multi-page documents may be produced from image data received as character code signals to be applied to a raster image processor for conversion to a rasterized video data stream for printing, the improvement being:

means, sequentially following the raster image processor, for electronically storing in rasterized form the image data of a multi-page document; and electronic collation means for presenting the stored image data for printing in the proper sequence, as often as is needed to produce the desired number of collated document sets, whereby a plurality of electronically collated, multi-page sets can be printed without re-rasterization.

2. The process of producing a desired plurality of collated sets of multi-page documents from image data received as character code signals, said process comprising the steps of:

applying the character code signals to a raster image processor;

converting the character code signals to a rasterized video data stream for printing;

electronically storing the rasterized image data of a multi-page document; and electronically collating the stored image data by presenting it for printing in the proper sequence, as often as is needed to produce the desired plurality of collated document sets, whereby a plurality of electronically collated sets can be printed without re-rasterization.

3. In an electronic printer of the type wherein a desired plurality of collated sets of multi-page documents may be produced from image data received as character code signals to be applied to a raster image processor for conversion to a rasterized video data stream for printing, the improvement comprising means, sequentially following the raster image processor, for compressing the rasterized image date;

means, sequentially following the compressing means, for electronically storing in compressed rasterized form the image data of a multi-page document;

means, sequentially following the storing means, for electronically expanding the stored image data; and electronic collation means for presenting the expanded image data for printing in the proper sequence, as often as is needed to produce the desired plurality of collated document sets without re-rasterization.

4. The process of producing a desired plurality of collated sets of multi-page documents from image data received as character code signals, said process comprising the steps of:

applying the character code signals to a raster image processor;

converting the character code signals to a rasterized video data stream;

compressing the rasterized image data;

electronically storing the compressed rasterized image data of a multi-page document;

expanding the stored image data; and electronically collating the expanded image data by presenting it for printing in the proper sequence, as often as is needed to produce the desired plurality of collated document sets, whereby a plurality of electronically collated, multi-page sets can be printed without re-rasterization.

5. The process of producing a desired plurality of collated sets of multi-page documents from image data received as character code signals, said process comprising the steps of;

converting the character code signals to a rasterized video data stream for printing;

electronically storing the rasterized image data of a multi-page document; and presenting the stored image data for printing in the proper sequence as often as is needed to produce the desired plurality of collated document sets without re-rasterization.

6. The process of producing a desired plurality of collated sets of multi-page documents from image data received as character code signals, said process comprising the steps of;

converting the character code signals to a rasterized video data stream;

compressing the rasterized image data;

electronically storing the compressed rasterized image data of a multi-page document;

expanding the stored image data; and presenting the expanded image data for printing in the proper sequence as often as is needed to produce the desired plurality of collated document sets without re-rasterization.

* * * * *